US006702678B1

(12) United States Patent
Mason

(10) Patent No.: US 6,702,678 B1
(45) Date of Patent: Mar. 9, 2004

(54) POWER TRANSMISSION BY MAGNETIZED BALL COUPLING

(76) Inventor: James A. Mason, 5501 Avant Garde Ct., Las Vegas, NV (US) 89146

( * ) Notice: Subject to any disclaimer, the term of this patent is extended or adjusted under 35 U.S.C. 154(b) by 0 days.

(21) Appl. No.: 10/242,274

(22) Filed: Sep. 12, 2002

Related U.S. Application Data

(60) Provisional application No. 60/318,758, filed on Sep. 12, 2001.

(51) Int. Cl.$^7$ ............................................. F16D 27/02
(52) U.S. Cl. ..................................... 464/29; 192/84.1
(58) Field of Search .......................... 464/29; 192/84.1, 192/84.8; 384/446; 310/90.5, 103

(56) References Cited

U.S. PATENT DOCUMENTS

| | | | | |
|---|---|---|---|---|
| 2,621,494 A | * | 12/1952 | Cross | 464/29 |
| 2,624,435 A | * | 1/1953 | Stephenson | 192/84.1 X |
| 3,424,395 A | * | 1/1969 | Schmidt et al. | 192/84.8 X |
| 4,371,218 A | * | 2/1983 | Ichikawa | 310/90.5 |

* cited by examiner

Primary Examiner—Greg Binda
(74) Attorney, Agent, or Firm—James M. Deimen

(57) ABSTRACT

A mechanical ball coupling or clutch comprises a plurality of magnetizable balls located between inner and outer concentric caged needle rollers without raceways. The caged needle rollers are concentric with the axis of a hollow non-magnetic rotatable shaft which carries therewithin an actuateable electromagnet. Substantially surrounding the caged needle rollers and balls to form chambers therefor is a rotatable concentric shell of a non-magnetic material. Upon actuation of the electromagnet, the balls and needle rollers magnetically nest together to form a torque transmitting condition between the hollow shaft and the shell. A third set of needle rollers mounted in the wall of the hollow shaft allow the electromagnet to float in a non-rotating condition within the rotating hollow shaft.

7 Claims, 1 Drawing Sheet

POWER TRANSMISSION BY MAGNETIZED BALL COUPLING

This application claims the benefit of provisional patent application No. 60/318,758, filed Sep. 12, 2001.

BACKGROUND OF THE INVENTION

The field of the invention pertains to mechanical power transmission through electromagnetic clutches and couplings, and, in particular, to clutches and couplings that utilize a large plurality of steel balls contained within one or more chambers.

An example of a clutch or coupling utilizing balls is U.S. Pat. No. 5,163,873 to the applicant wherein coaxial shafts are coupled and uncoupled by a large plurality of balls in a pair of annular chambers that surround one of the shafts. A first wall of each chamber is formed by a hollow concentric shell affixed to rotate with the other shaft, and a second concentric wall of each chamber is movable in response to the squeezing of a magnetically actuated spiral coil. Magnetic actuation of the spiral coil causes the movement of the second concentric walls to squeeze the balls tightly against the first shaft and the first concentric wall of the shell thereby providing a driving engagement between the first and second shafts.

Although a workable coupling or clutch for many applications, the above device employs a relatively large external electromagnet to actuate the spiral coil. The electromagnet comprises an appendage located outside of the concentric shell, thus greatly increasing the overall diameter of the device and effectively preventing its use inside an electric motor, for example. To provide an electromagnetically operable coupling or clutch of compact size, applicant has developed the device disclosed below.

Most of the present power transmission clutches, in particular for vehicles, are based on principles of friction. Friction disc packs, bands, hydraulic pistons and cylinders and splined disc drive members are employed under the control of computer generated commands to operate various valves or ports. When a vehicle accelerates or decelerates through shift points, the disc packs or bands slip generating considerable heat which must be dissipated and limiting the life of the friction parts.

SUMMARY OF THE INVENTION

The new ball coupling or clutch comprises a plurality of magnetizable balls located between inner and outer concentric caged needle rollers without raceways. The caged needle rollers are concentric with the axis of a hollow non-magnetic rotatable shaft which carries therewithin an actuateable electromagnet. Substantially surrounding the caged needle rollers and balls to form chambers therefor is a rotatable concentric shell of a non-magnetic material. Upon actuation of the electromagnet, the balls and needle rollers magnetically nest together to form a torque transmitting condition between the hollow shaft and the shell. A third set of needle rollers mounted in the wall of the hollow shaft allows the electromagnet to float in a non-rotating condition within the rotating hollow shaft. The configuration of the new coupling or clutch is ideally suited for incorporation within an electric motor without external appendages or significant increase in overall diameter of the motor.

Since the new coupling or clutch does not rely upon friction to transmit torque, heat generation is limited and heat more easily removed by air or other fluid convection among the balls and rollers in addition to heat conduction through contact among the balls and rollers. Whether free-running or locked up, there are open spaces for fluid flow throughout the ball and roller clusters thereby providing every contact point within the clusters with fluid cooling. Choice of air, oil or water does not significantly change the torque rating of the coupling or clutch because the oil or water film cannot withstand the very high pressures on the very small contact points among the curved surfaces of the balls and rollers. Wear is minimized and spalling prevented by the very large number of balls and rollers which create a very large number of contact points.

Experimental testing has revealed that the electrical control of the electromagnet is linear between the extremes of free running and fully locked-up torque transmission. With sufficient magnetism applied, rated torque "lock-up" is maintained. When the magnetic field is turned off, the ball and roller cluster rapidly returns to the free-running state. The coupling or clutch can tolerate high magnetic coil current "impulse torques" of short duration several times greater than normal rated torque. Cyclic testing has also shown that wear of the working parts of the coupling or clutch is minimal largely due to the rolling contact among the balls and rollers, the hardened steel surfaces of the contacting balls and rollers and low heat retention of the configuration.

The new coupling is ideally suited for electric vehicle drives; specifically, for "in the wheel" induction motor planetary drives. A pure electric vehicle with a D.C. powered, solid state, adjustable frequency alternating current source eliminates the need for a main engine, drive train, differentials or universal joints. Where a hybrid vehicle is required, the gasoline or diesel engine need only drive a D.C. or A.C. generator of sufficient capacity. The new coupling or clutch is ideally suited to straightforward solid state control with the coupling or clutch and the electric motor operated for maximum torque or maximum efficiency as desired.

DESCRIPTION OF THE PREFERRED EMBODIMENT

Figure 1:
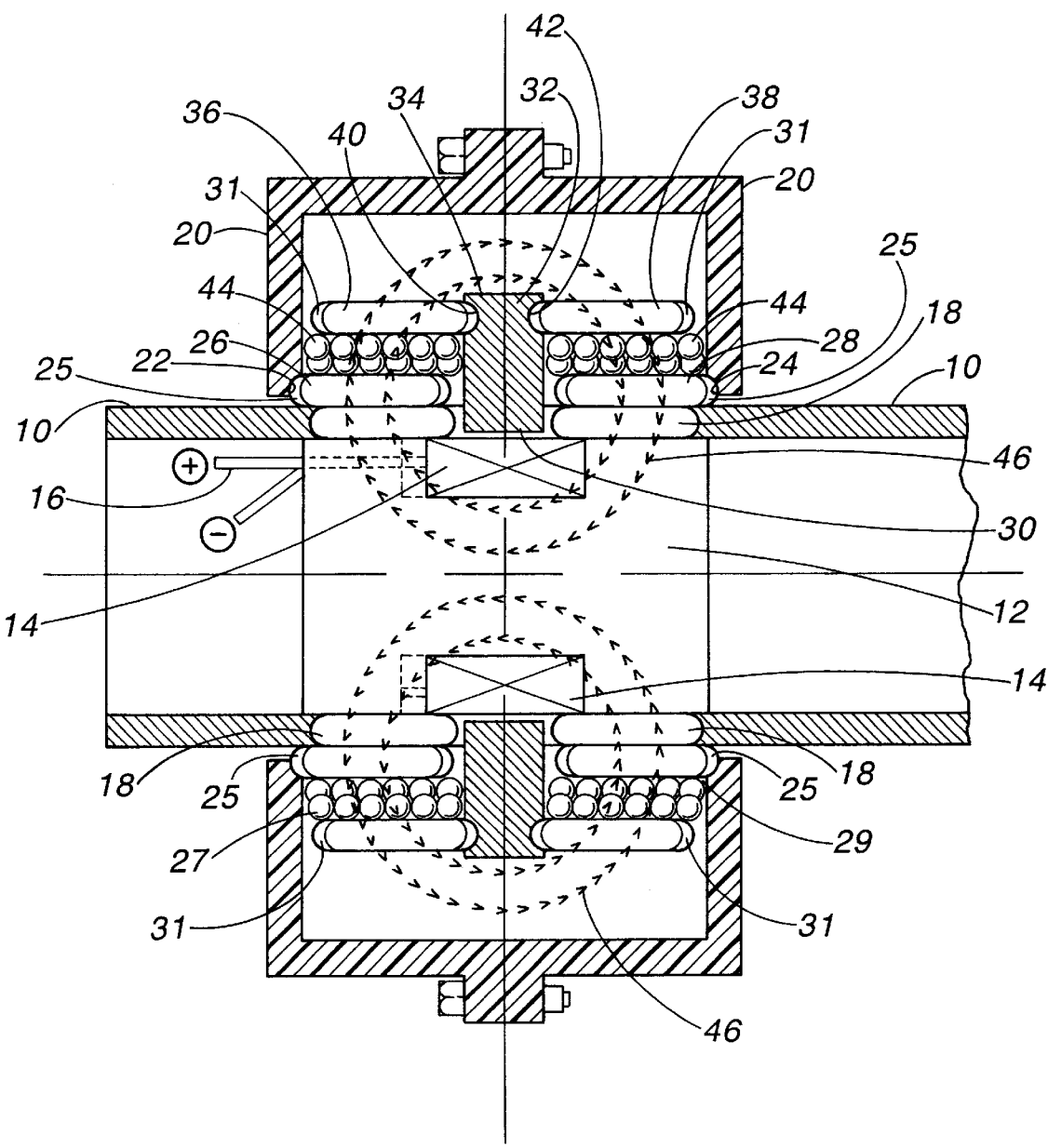
FIG. 1 depicts a cross-section of the new coupling or clutch.

In FIG. 1, a hollow shaft 10 is rotatable about an axis and is formed from a non-magnetic material such as brass or austenitic steel. Residing within the hollow shaft 10 is an electromagnet 12 having a concentric electric energizing coil 14 and electric lead wires 16. The electromagnet 12 non-rotatably floats on a plurality of needle rollers 18 mounted in the shaft 10 wall in two spaced apart sets.

Surrounding the shaft 10 and electromagnet 12 is a concentric shell 20 of a non-magnetic material here shown as plastic. Affixed to the shell at 22 and 24 are a pair of caged 25 needle roller sets 26 and 28, respectively. The shell 20 can thereby freely rotate about the shaft 10. Mounted 30 on the shaft 10 or integral therewith is a concentric flange 32 positioned between the pair of caged needle roller sets 26 and 28 but spaced therefrom. Near the outer periphery 34 of the flange 32 is another pair of caged 31 needle roller sets 36 and 38 affixed to the flange 32 on each side as shown at 40 and 42. Within two chambers 27 and 29 formed by the shell 20, flange 32 and sets of rollers 26 and 36 and 28 and 38, respectively, are a large number of spherical balls 44. The balls 44 substantially fill the enclosed volume but with sufficient freedom to provide easy rolling contact among the balls and with the sets of rollers 26 and 36 and 28 and 38. The balls 44 and rollers of the sets 26, 28, 36 and 38 are formed of magnetic material such as the hardened steel typically used in ball bearings and needle roller bearings; however, other magnetic materials might be employed for special applications.

As noted above, absent electric current in the energizing coil 14, the balls 44 and needle rollers 26, 28, 36 and 38 are free running with rolling substantially point contact. Upon the application of sufficient electric current, the magnetic field as indicated by the circular arrangements of arrows 46 causes the balls 44 and rollers 26, 28, 36 and 38 to freeze together locking up the coupling or clutch for maximum transmission of torque between the shaft 10 and the shell 20. The shell 20 and shaft 10 thus rotate as a unit about the electromagnet 12 upon the application of rotational torque to either the shaft or the shell.

An important feature of the coupling or clutch is the capability of linearly increasing or decreasing the torque carrying capacity from substantially zero at free running to maximum design torque at lock-up. The coupling or clutch can accommodate additional torque above design torque, however, the action is that of a solid coupling rather than a "frictionless" clutch.

The coupling or clutch is particularly suited to applications where it can be located within an electric motor and the electric motor located within or immediately adjacent a wheel on a wheeled vehicle. The coupling or clutch is very simple to construct out of very common commercially available parts and therefore can be very economically manufactured.

What is claimed is:

1. A mechanical coupling comprising a hollow shaft and a shell having at least one chamber therein, said chamber concentric with the shaft, a first plurality of caged rollers concentric with the shaft and forming an inner wall of the chamber, said cage for the first plurality of rollers affixed to the shell, a second plurality of caged rollers concentric with the shaft and forming an outer wall of the chamber, said cage for the second plurality of rollers affixed to the shaft, a plurality of balls of a magnetizable material substantially filling the chamber between the first and second pluralities of rollers, whereby absent a magnetic field the shaft and shell are free to rotate independent of each other and upon application of a sufficient magnetic field through the balls and first and second pluralities of rollers, the balls and first and second pluralities of rollers lock into a torque transmitting engagement between the shaft and the shell.

2. The mechanical coupling of claim 1, including two of said chambers, said chambers each containing a plurality of the balls.

3. The mechanical coupling of claim 1, including two of said chambers, said chambers separated by a flange affixed to the shaft, said chambers each containing a plurality of balls.

4. The mechanical coupling of claim 1 wherein said shaft is hollow within the coupling and wherein an electromagnet is located within the shaft and coupling.

5. The mechanical coupling of claim 4, including a third set of rollers on the shaft, said electromagnet freely rotatable on the third set of rollers relative to the shaft.

6. The mechanical coupling of claim 1 wherein the shell is constructed of non-magnetic material.

7. The mechanical coupling of claim 1 wherein the shaft is constructed of non-magnetic material.

\* \* \* \* \*